No. 870,920. PATENTED NOV. 12, 1907.
J. E. WOOD.
WATER HEATER AND PURIFIER.
APPLICATION FILED MAY 27, 1907.

UNITED STATES PATENT OFFICE.

JOHN EDWARD WOOD, OF NOTTINGHAM, ENGLAND.

WATER HEATER AND PURIFIER.

No. 870,920.　　　　　Specification of Letters Patent.　　　　　Patented Nov. 12, 1907.

Application filed May 27, 1907. Serial No. 375,930.

*To all whom it may concern:*

Be it known that I, JOHN EDWARD WOOD, a subject of the King of Great Britain, and resident of the city of Nottingham, in the county of the said city, England, have invented new and useful Improvements in Water Heaters and Purifiers, of which the following is a specification.

This invention relates to improvements in an apparatus for heating and purifying water for steam generators, and has particular reference to improvements in an apparatus suitable for use in the steam space of Cornish, Lancashire, and similar steam generators; the object of the present invention being the construction of an apparatus, for use inside the generator, by and through which all the feed water delivered to the generator is exposed to the action of the steam inside the generator, and is directed through purifiers or scrubbers, also, the provision of settling tanks for collecting the impurities given up by the water and means by which such impurities can at any time be removed from the generator.

Figure 1:
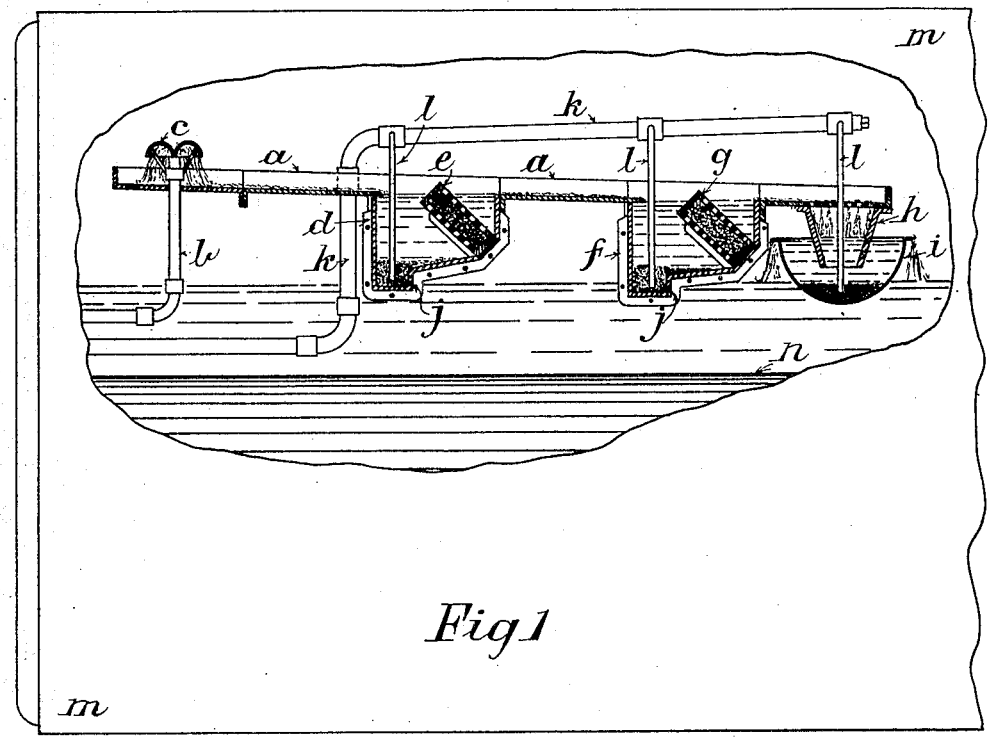
Figure 2:
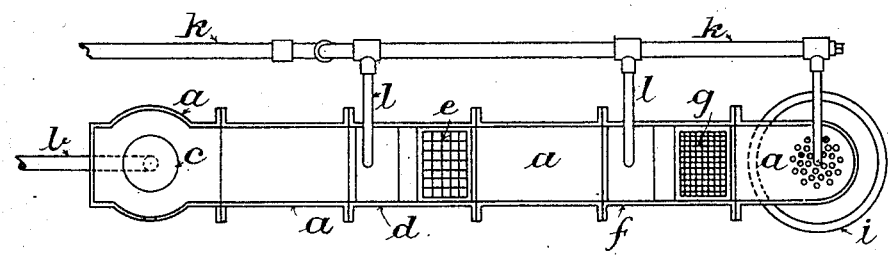

In the accompanying drawings Figure 1 is the side elevation of part of a steam generator which is broken to show the construction and arrangement of the improved apparatus, and Fig. 2 is a plan of the improved apparatus.

The improved heating and purifying apparatus comprises a tray $a$ which is slightly inclined from the point at which the feed water is delivered to insure the water flowing towards the delivery end of the tray. The feed water is forced into the generator by a pump, injector, or the like through a pipe $b$ which is bent upwards through and above the tray $a$, and at its upper end is provided with a spraying hood $c$ by which the water from the pipe $b$ is broken up and delivered in the form of a spray or in fine streams on to the tray $a$, which is widened as shown to receive the water, and this water flows down the tray in a thin film which being exposed to the action of the steam is raised to a high temperature and part of it evaporated. The unevaporated water then flows into the settling chamber $d$ and mixes with a comparatively large body of water. Some of the impurities then fall to the bottom of the tank and as the water leaves the tank it is compelled to pass through a filter or scrubber $e$. After leaving the tank the water flows over another length of the tray and enters a second settling tank $f$ where further impurities are deposited and the water again filtered by the filter $g$ which is arranged similarly to the filter $e$. The water then flows over another length of the tray and passes through holes or a grating to a conical baffle $h$ by which the water is delivered near the bottom of a third settling tank $i$ which is preferably circular in plan and from which the water in a heated and purified condition is delivered to the generator.

The settling tanks $d$ and $f$ are made with bottom plates which are inclined towards a trough $j$ and the bottom of this trough is inclined from both sides towards the center. The filters or scrubbers $e$ and $g$ are in the form of boxes or cases which have perforated top and bottom plates and are filled with pieces of coke or similar filtering medium. These filters are detachably carried by the settling tanks and the filter $g$ has finer holes and a finer filtering medium than the filter $e$ to insure the separation from the water of impurities which have passed through the filter $e$. For removing the sediment at the bottom of the settling tanks a blow-off pipe $k$ is provided. This pipe is arranged in any convenient position relatively to the other parts of the apparatus and is fitted with branch pipes $l$, the open ends of which are fixed near the lowest points in the settling tanks.

The tray, and all the connected parts, are made in sections of such a size that they can be introduced into the generator $m$, and when inside the generator they can be fastened together, and are held in the steam space by bolts from the top of the generator, or by supporting brackets from the flues or other convenient part of the generator.

By means of an apparatus of the kind herein described and by arranging such apparatus in the steam space in the generator all the feed water delivered to the generator is exposed to the direct action of the steam. This raises the water to a high temperature, evaporates a portion of it, and thereby liberates mineral matters which are collected in the settling tanks while grease and other objectionable matters are separated from the water by means of the purifiers.

The length of the tray and the number of settling tanks and purifiers are varied according to the type and size of the generator and the kind of water used.

I claim.

1. The combination of a tray, a series of settling chambers intermediate between its ends arranged at intervals apart, means for breaking up or spraying the water as it is fed into the boiler, arranged at one end of the tray, means for purifying the water in each settling chamber, and a settling chamber at the discharge end of the tray.

2. The combination of an inclined tray formed of a series of sections over which the water flows in a thin sheet, a settling chamber located between adjoining sections, means for feeding water to the head end of the tray, and means for spraying or breaking up the water as it is fed.

3. The combination of an inclined tray, and a series of settling tanks intermediate between its ends and arranged at intervals apart, each of said tanks being formed with a depressed portion or trough in its bottom to receive the impurities in the water.

4. The combination of a feed water pipe with a hood or cowl for breaking up the feed water, an inclined tray, a settling tank with a trough at one end, a purifier and a blow off pipe arranged in the steam space of a steam generator substantially as herein set forth.

5. The combination of a feed water pipe with a hood or cowl for breaking up the water, an inclined tray in sections, two settling tanks with troughs at one end, a coarse purifier or scrubber in one settling tank, a fine purifier or scrubber in the other tank, and a blow off pipe with branch connections, arranged in the steam space of a steam generator substantially as herein set forth.

6. The combination of a feed water pipe, with a cowl or hood, an inclined tray settling tanks with troughs at one end, purifiers or scrubbers in such tanks arranged with one part above the level of the tray, a conical baffle at the delivery end of the tray, a hemispherical settling tank from which the water flows into the generator, a blow-off pipe and branch connections between the blow-off pipe and settling tanks, arranged in the steam space of a steam generator substantially as herein set forth.

JOHN EDWARD WOOD.

Witnesses:
 WILLIAM H. POTTER,
 JOHN ARCHER.